W. C. PRITCHARD.
SEALING ATTACHMENT FOR PUMPS.
APPLICATION FILED FEB. 13, 1911.
1,067,374.
Patented July 15, 1913.
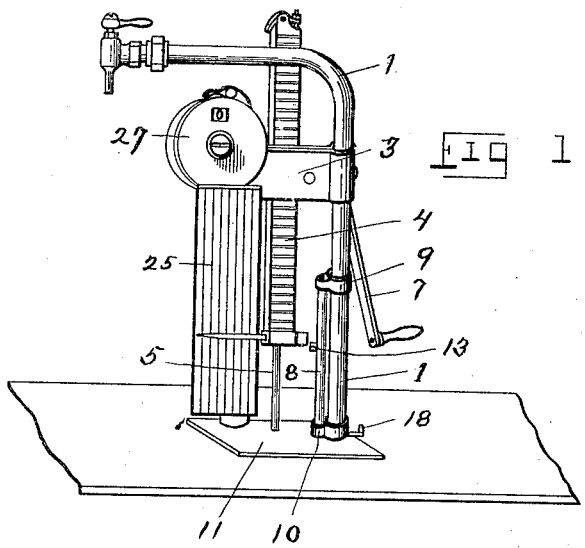
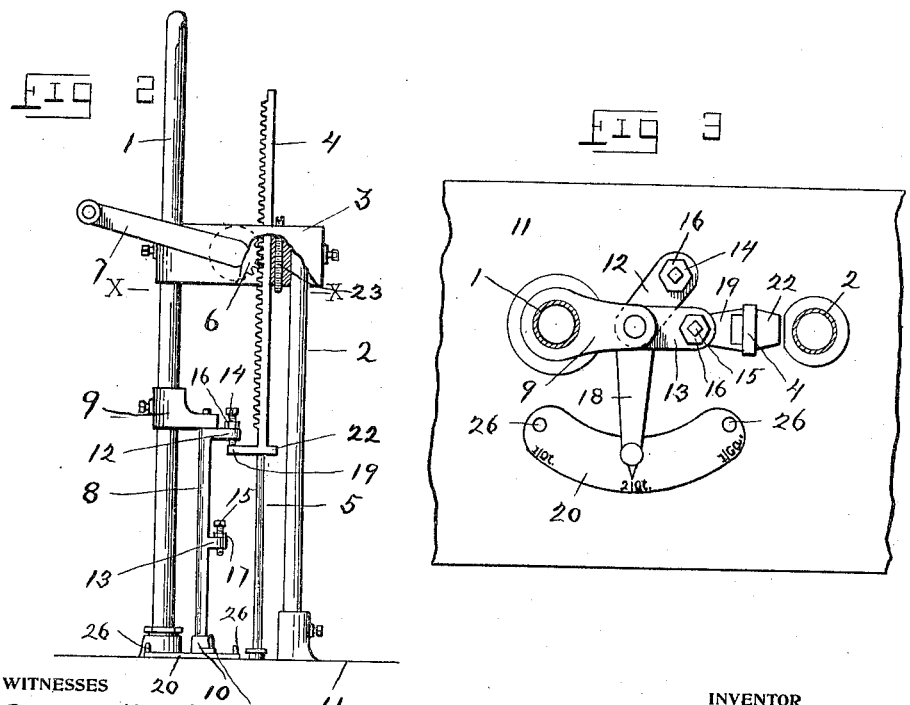
WITNESSES
B. P. Faltin
M. L. Lefere
INVENTOR
William C. Pritchard
BY
John J. Thompson
ATTORNEY

UNITED STATES PATENT OFFICE.

WILLIAM C. PRITCHARD, OF LANCASTER, PENNSYLVANIA, ASSIGNOR TO NATIONAL STORE SPECIALTY COMPANY, OF LANCASTER, PENNSYLVANIA, A CORPORATION OF PENNSYLVANIA.

SEALING ATTACHMENT FOR PUMPS.

1,067,374.  Specification of Letters Patent.  Patented July 15, 1913.

Application filed February 13, 1911. Serial No. 608,268.

*To all whom it may concern:*

Be it known that I, WILLIAM C. PRITCHARD, a citizen of the United States, residing at Lancaster, in the county of Lancaster and State of Pennsylvania, have invented certain new and useful Improvements in Sealing Attachments for Pumps, of which the following is a specification, reference being had therein to the accompanying drawing.

This invention relates to measuring pumps of that class which are employed in connection with the dispensing of liquids, such as oil and gasolene, in various quantities which have been predetermined.

The objects of the invention are to provide a sealing or measuring device that shall be simple, cheap, and that will so limit the stroke of the pump piston as to accurately measure certain predetermined quantities.

Another object of the invention is to provide a device of this class that may be used with the usual styles of dispensing pumps whereby the measure of the various quantities of liquid may be sealed or locked to prevent variations, and yet may be adjusted to correct any inaccuracies caused by wear, etc.

Still another object is, in a sealing or locking device of this class, to provide a novel mechanism that will assure the delivery of any one of the predetermined quantities, and be at all times under the control of the operator.

With these and other objects in view, my invention consists in certain construction and combination of parts as will hereinafter be fully described and claimed, and illustrated in the accompanying drawings, which form a part of this application, and in which like figures of reference refer to corresponding parts in all of the views; but it is fully understood that while I have here described my invention as shown, that I do not confine myself to the exact design as shown, as slight changes may be made in the construction and arrangement of the several parts without departing from the spirit of the invention.

In the drawings:—Figure 1, is a perspective view of a pump embodying my invention. Fig. 2, is a detail elevation of a dispensing pump with my device attached thereto, showing the arrangement of the several parts. Fig. 3, is a detail view partly in section, taken on the line X—X of Fig. 2.

Referring to the drawings, the usual dispensing pump is shown which comprises the discharge pipe 1, the standard 2, and the gear box or frame 3, secured thereto. Within the gear case or frame 3, is mounted the reciprocating rack-bar 4, which is attached to the upper end of the piston rod 5, which operates the usual pump piston in the tank (not shown). For reciprocating the rack-bar 4, there is mounted in the gear case 3, a pinion 6, in mesh with said rack-bar 4, and rotated by a hand-crank 7.

At a suitable point adjacent to the discharge pipe 1, and the piston rod 5, is rotatably mounted an upright 8, having its upper end journaled in the adjustable bearing bracket 9, attached to the discharge pipe 1, and its lower end journaled in a bearing 10, formed in the base plate 11. Said upright 8, is provided with a number of radial arms 12, and 13, which are provided with the adjustable stop pins 14, and 15, that are screw-threaded therein, and which are provided with the lock nuts 16, and 17. The arms 12, and 13, with their stop pins 14, and 15, are adapted to be moved into a position to intercept and limit the upward or discharge strokes of the piston-rod 5, at predetermined points, by an operating handle 18, which is attached to the lower end of said upright 8; said stop pins 14, and 15, engaging a projection 19, formed on said rack-bar 4.

To easily, rapidly and accurately position the stop pins 14, and 15, where either one or the other will intercept the projection 19, and limit the upward movement of the piston-rod, thus controlling the quantity of liquid discharged; said stops being positioned out of alinement with each other, a sector-plate 20, is secured to the base plate 11, by the stop pins 26, which limit the swing of said operating handle 18, over the sector-plate 20. Said sector-plate 20, is provided with graduations or indicating marks which correspond to the stops and indicate the predetermined quantities of liquid discharged within the capacity of one full stroke of the pump piston. As indicated, the stops and sector-plate may be arranged to limit and indicate any predetermined quantity of liquid within the limits of the full capacity of the pump, and as herewith illustrated, the full capacity of one full stroke of the pump is one gallon, and the stops 14, and 15, when employed, limit the action of the piston, and thereby, the discharge of the pump, to one and two quarts, respectively, and to measure one gallon or other fractional parts thereof, the piston rod 5, is further provided with a projection 22, which is adapted to engage an adjustable stop 23, mounted in the gear case, and locked therein by the set-screw 24. To further complete the device, a computing chart, scale or tabulated quantity indicating device 25, is provided, which may be so arranged as to indicate the prices per stated quantity, and in connection therewith is shown an automatic recorder 27, which is operated by the upward stroke of the piston-rod, and is adapted to record the quantity of liquid discharged by said pump during a single sale, said recorder forming the subject of my application for Letters Patent filed February 13, 1911, Serial No. 608,267.

The operation of the device is as follows: To set and seal the adjustable stops, so that they will control and predetermine the quantities of liquid to be delivered by the pump according to standard measurements, the operating handle is first moved to bring one of the stops into the path of the projection on the piston rod. The piston rod is then actuated until limited by said stop, and is then reversed to discharge the liquid into a receptacle of standard capacity, corresponding to the stop employed; and if the liquid overflows or does not fill the standard receptacle, the stop is adjusted until the required amount of liquid is delivered, and this operation is repeated for each stop until all have been sealed.

Having thus described my invention what I claim as new and desire to secure by Letters Patent is:—

In a device of the character described, the combination with a pump piston rod and a discharge pipe, a bearing adjustably mounted upon said discharge pipe, a sector plate formed with indicating devices and mounted adjacent the discharge pipe, a base plate having a bearing formed thereon, a rotatable upright member detachably mounted in said bearings, a stop carried by the piston rod, radial arms projecting from the upright member at relatively different angles, whereby only one arm will be disposed beneath the stop at the same time, stops carried by the radial arms for engagement with the stop carried by the piston rod, and an indicator arm carried by the upright member.

In testimony whereof I affix my signature in presence of two witnesses.

WILLIAM C. PRITCHARD.

Witnesses:
JOHN J. THOMPSON,
I. C. ARNOLD.

---

Copies of this patent may be obtained for five cents each, by addressing the "Commissioner of Patents, Washington, D. C."